United States Patent
Kato

(10) Patent No.: US 11,668,870 B2
(45) Date of Patent: Jun. 6, 2023

(54) OPTICAL COMMUNICATION DEVICE, OPTICAL TRANSMISSION SYSTEM, WAVELENGTH CONVERTER, AND OPTICAL COMMUNICATION METHOD

(71) Applicant: FUJITSU LIMITED, Kawasaki (JP)

(72) Inventor: Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 511 days.

(21) Appl. No.: 16/781,103

(22) Filed: Feb. 4, 2020

(65) Prior Publication Data

US 2020/0271855 A1 Aug. 27, 2020

(30) Foreign Application Priority Data

Feb. 21, 2019 (JP) .............................. JP2019-029740

(51) Int. Cl.
*G02B 6/02* (2006.01)
*G02F 1/35* (2006.01)
*G02F 1/365* (2006.01)
*H04J 14/02* (2006.01)

(52) U.S. Cl.
CPC ......... *G02B 6/0228* (2013.01); *G02F 1/3534* (2013.01); *G02F 1/3536* (2013.01); *G02F 1/365* (2013.01); *H04J 14/02* (2013.01)

(58) Field of Classification Search
None
See application file for complete search history.

(56) References Cited

U.S. PATENT DOCUMENTS

| 5,960,146 A | 9/1999 | Okuno et al. |
| 2001/0055436 A1 | 12/2001 | Sugizaki et al. |
| 2003/0063860 A1 | 4/2003 | Watanabe |
| 2004/0218879 A1* | 11/2004 | Epworth ................ G02B 6/023 385/122 |
| 2006/0051039 A1* | 3/2006 | Wei .................... H04B 10/2531 385/123 |
| 2006/0139740 A1* | 6/2006 | Korolev .............. H01S 3/06754 359/341.1 |

(Continued)

FOREIGN PATENT DOCUMENTS

| EP | 1298485 A2 | 4/2003 |
| EP | 1762868 A1 | 3/2007 |

(Continued)

OTHER PUBLICATIONS

Shigeki Watanabe et al., "Interband Wavelength Conversion of 320 GB/s (32x10 GB/s) WDM Signal Using a Polarizaion-Insensitive Fiber Four-Wave Mixer", ECOC'98, Sep. 20-24, 1998, pp. 85-87, Madrid, Spain (Total 2 Pages).

(Continued)

Primary Examiner — Chris H Chu
(74) Attorney, Agent, or Firm — Fujitsu Patent Center

(57) ABSTRACT

An optical communication device includes an excitation light source that outputs excitation light, a multiplexer that multiplexes signal light and the excitation light outputted from the excitation light source, a first nonlinear optical medium into which the multiplexed excitation light and the signal light are inputted, and a second nonlinear optical medium that is coupled to the first nonlinear optical medium in series and has an optical property different from that of the first nonlinear optical medium.

5 Claims, 12 Drawing Sheets

(56) References Cited

U.S. PATENT DOCUMENTS

| | | | |
|---|---|---|---|
| 2007/0047962 | A1 | 3/2007 | Hirano et al. |
| 2009/0207481 | A1 | 8/2009 | Okuno |
| 2013/0101248 | A1 | 4/2013 | Takasaka |
| 2020/0059313 | A1 | 2/2020 | Kato et al. |

FOREIGN PATENT DOCUMENTS

| | | |
|---|---|---|
| EP | 2083320 A1 | 7/2009 |
| JP | 7-84289 | 3/1995 |
| JP | 2001-242336 | 9/2001 |
| JP | 2004-163982 A | 6/2004 |
| JP | 2007-17907 A | 1/2007 |
| JP | 2007-72182 | 3/2007 |
| JP | 2008-152133 | 7/2008 |
| JP | 2018-191074 | 11/2018 |
| WO | 2011/115293 A1 | 9/2011 |
| WO | 2018/198478 A1 | 11/2018 |

OTHER PUBLICATIONS

Katsumi Uesaka, et al., "Wavelength Exchange in a Highly Nonlinear Dispersion-Shifted Fiber: Theory and Experiments", IEEE Journal of Selected Topics in Quantum Electronics, vol. 8, No. 3, pp. 560-568, May/Jun. 2002 (Total 9 Pages).

Issac Sackey et al., "Waveband-Shift-Free Optical Phase Conjugator for Spectrally Efficient Fiber Nonlinearity Mitigation", Journal of Lightwave Technology, vol. 36, No. 6, pp. 1309-1317, Mar. 15, 2018 (Total 9 Pages).

Tomoyuki Kato et al., "Fiber-Optic Frequency Shifting of THz-Range WDM Signal Using Orthogonal Pump-Signal Polarization Configuration", OFC 2018, OSA 2018 (Total 3 Pages).

EESR—The Extended European Search Report of European Patent Application No. 20154573.8 dated Sep. 1, 2020.

CNOA—Office Action of Chinese Patent Application No. 202010102118.0 dated Dec. 29, 2021 with English Translation.

JPOA—Office Action of Japanese Patent Application No. 2019-029740 dated Aug. 16, 2022 with Machine translation.

* cited by examiner

OPTICAL COMMUNICATION DEVICE, OPTICAL TRANSMISSION SYSTEM, WAVELENGTH CONVERTER, AND OPTICAL COMMUNICATION METHOD

CROSS-REFERENCE TO RELATED APPLICATION

This application is based upon and claims the benefit of priority of the prior Japanese Patent Application No. 2019-29740, filed on Feb. 21, 2019, the entire contents of which are incorporated herein by reference.

FIELD

The embodiments discussed herein are related to an optical communication device, an optical transmission system, a wavelength converter, and an optical communication method.

BACKGROUND

With an increase in communication demand, an expansion in transmission capacity has been desirable. The transmission capacity is expanded by, for example, increasing the number of cores of optical fibers, increasing the capacity of optical signals per wavelength, and increasing the number of wavelength division multiplexing (WDM) channels. Since the cost of laying optical fibers is high, it is desirable to expand the transmission capacity without increasing the number of optical fiber cores. It is desirable that a transmission device has a transmission capacity increased by increasing the optical signal capacity and the number of WDM channels. However, there is a limitation on an expansion in transmission capacity with only the communication band (C band). To further expand the transmission capacity, it is desirable to utilize not only the C band but also the long wavelength region (L band) and the short wavelength region (S band) of the C band.

Developing optical transmitters and receivers, wavelength multiplexers and demultiplexers, optical amplifiers, and other components for the S band, the C band, and the L band increases the costs as compared with a transmission device using a single one wavelength band. It has been studied to expand the communication band utilizing wavelength conversions with a C-band transmission device.

A nonlinear optical fiber has been proposed that has fourth-order dispersion in a predetermined range in a wavelength range of 1520 nm to 1620 nm. Wavelength conversions with a single wavelength of excitation light using a four-wave mixing and wavelength conversions using orthogonally polarized two wavelengths of excitation light and parallel polarized two wavelengths of excitation light have been known.

Related art disclosed includes, for example, Japanese Laid-open Patent Publication No. 2007-17907, Shigeki Watanabe, Shinich Takeda, and Terumi Chikama, "INTER-BAND WAVELENGTH CONVERSION OF 320 GB/S (32×10 GB/S) WDM SIGNAL USING A POLARIZAION-INSENSITIVE FIBER FOUR-WAVE MIXER" ECOC'98, 20-24 Sep. 1998. Madrid, Spain, and Katsumi Uesaka, et al., "WAVELENGTH EXCHANGE IN A HIGHLY NONLINEAR DISPERSION-SHIFTED FIBER: THEORY AND EXPERIMENTS", IEEE Journal of Selected Topics in Quantum Electronics, Vol. 8, No. 3, May/June 2002.

SUMMARY

According to an aspect of the embodiments, an apparatus includes an optical communication device includes an excitation light source that outputs excitation light, a multiplexer that multiplexes signal light and the excitation light outputted from the excitation light source, a first nonlinear optical medium into which the multiplexed excitation light and the signal light are inputted, and a second nonlinear optical medium that is coupled to the first nonlinear optical medium in series and has an optical property different from that of the first nonlinear optical medium.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the wavelength conversions, the phase mismatch between the input light and the converted signal light due to the wavelength dispersion and the polarization mismatch due to the frequency-dependent polarization rotation cause the conversion efficiency to decrease. To conduct wavelength conversion on WDM signals all together, wavelength conversion is desirable that has favorable wavelength conversion characteristics in a wide band.

An object of the present disclosure is to expand the communication capacity by achieving wavelength conversion characteristics over a wide band in optical communications.

Figure 1A:
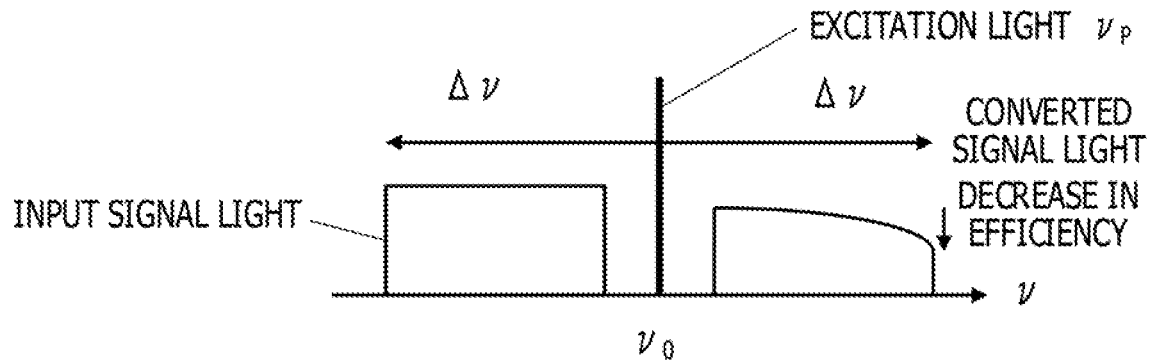
FIGS. 1A-1C are diagrams for explaining a decrease in conversion efficiency when wavelength conversion is applied to WDM.
Figure 1B:
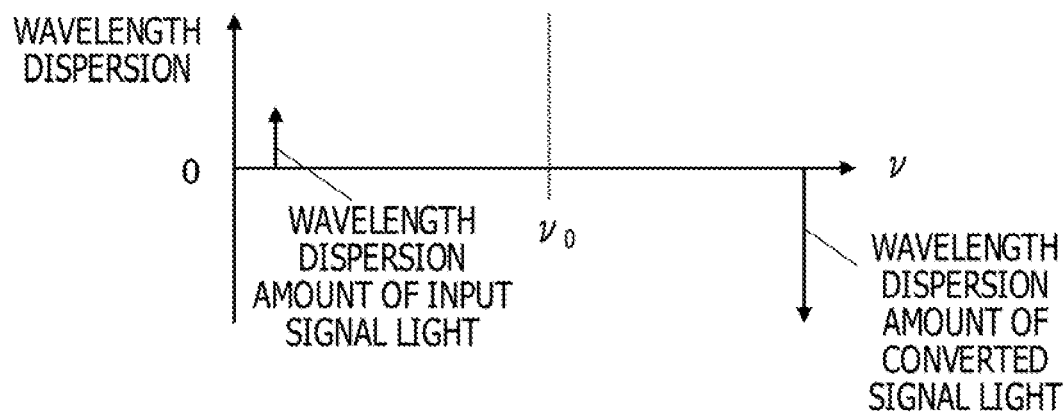
Figure 1C:
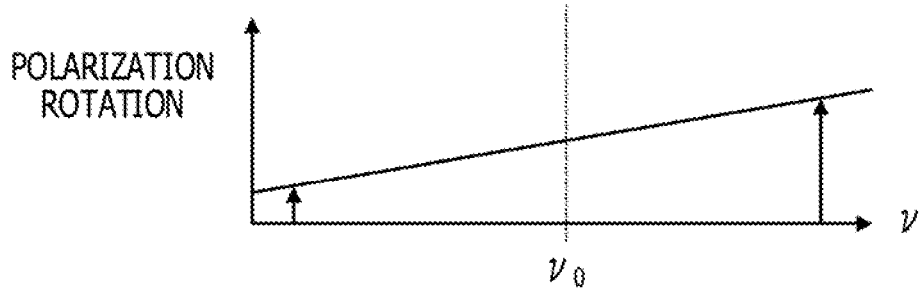

FIGS. 1A-1C are diagrams illustrating influences of wavelength dispersion and frequency-dependent polarization rotation when wavelength conversion is applied to WDM signal. FIG. 1A illustrates spectra of input signal light and converted signal light, FIG. 1B is a diagram illustrating phase mismatch between input signal light and converted signal light, and FIG. 1C illustrates mismatch in polarization rotation amount between input signal light and converted signal light.

Making input signal light and excitation light having a wavelength of $v_P$ incident on a nonlinear optical medium allows a converted signal light having a central wavelength of ($2v_P$–vi) to be obtained as output light of the nonlinear optical medium owing to the nonlinear optical effect. When a light wave having a sufficient intensity is incident on a nonlinear optical medium, nonlinear (second-order or more) polarization occurs inside the nonlinear optical medium on the incident electric field, and a light wave having a frequency component different from that of the incident light is generated by the oscillation of the polarization.

In the case of applying wavelength conversion to WDM signal, since light containing a plurality of wavelength components is converted all together, wavelength conversion characteristics over a wide band are desired.

Making the wavelength $v_P$ of excitation light coincident with zero dispersion wavelength $v_0$ makes it possible to maintain a high intensity of converted signal light. In wavelength conversion over a wide band, the spectrum of converted signal light is distorted by wavelength dispersion and frequency-dependent polarization rotation, lowering the conversion efficiency.

As in FIGS. 1A-1C, in the case of a single wavelength of excitation light, the difference in wavelength dispersion amount between input signal light and converted signal light is significant at an end of the waveband away from the excitation light wavelength $v_P$, so that the spectrum of the converted signal light is degraded by the phase mismatch. The degradation of the spectrum lowers the conversion efficiency and suppresses the conversion operation over a wide band. To provide a sufficient intensity to a converted signal light generated inside a nonlinear optical medium and perform conversion operation over a wide band, it is desirable that the phases of the input signal light and the converted signal light match over a desired band.

As illustrated in FIG. 1C, frequency-dependent polarization rotation occurs in light propagating inside a nonlinear optical medium due to the birefringence of the nonlinear optical medium. In this case, the conversion efficiency is lowered due to the mismatch in polarization between the input signal light and the converted signal light. In the case of using two beams of excitation light, the conversion efficiency is lowered due to the polarization crosstalk between the two beams of excitation light.

If it is possible to maintain the phase match between input signal light and converted signal light over a predetermined wavelength band and reduce the polarization rotation, a wavelength conversion over a wide band with a high efficiency is achieved.

The embodiment uses nonlinear optical media with at least one of phase mismatch due to wavelength dispersion and frequency-dependent polarization rotation being reduced. Specifically, nonlinear optical media having different signs or having different properties are combined to compensate for at least one of wavelength dispersion and frequency-dependent polarization rotation at the time of wavelength conversion.

Examples of combination of properties having different signs include a combination of a nonlinear optical medium whose polarization rotates clockwise and a nonlinear optical medium whose polarization rotates counterclockwise depending on a wavelength in the Stokes space, a combination of a nonlinear optical medium having a positive fourth-order dispersion value and a nonlinear optical medium having a negative fourth-order dispersion value, a combination of a nonlinear optical medium having a positive third-order dispersion value and a nonlinear optical medium having a negative third-order dispersion value, and the like. Two or more combinations among these combinations may be combined. For example, a combination of nonlinear optical media having clockwise and counterclockwise polarization rotations and a combination of nonlinear optical media having a positive fourth-order dispersion value and a negative fourth-order dispersion value may be combined.

In a favorable configuration, nonlinear optical media having different properties or having properties with different signs are arranged alternately in an optical axis direction. At least one of wavelength dispersion and frequency-dependent polarization rotation is compensated for to reduce at least one of phase mismatch and polarization mismatch between frequency components. This makes it possible to achieve wavelength conversion over a wide band.

Figure 2:
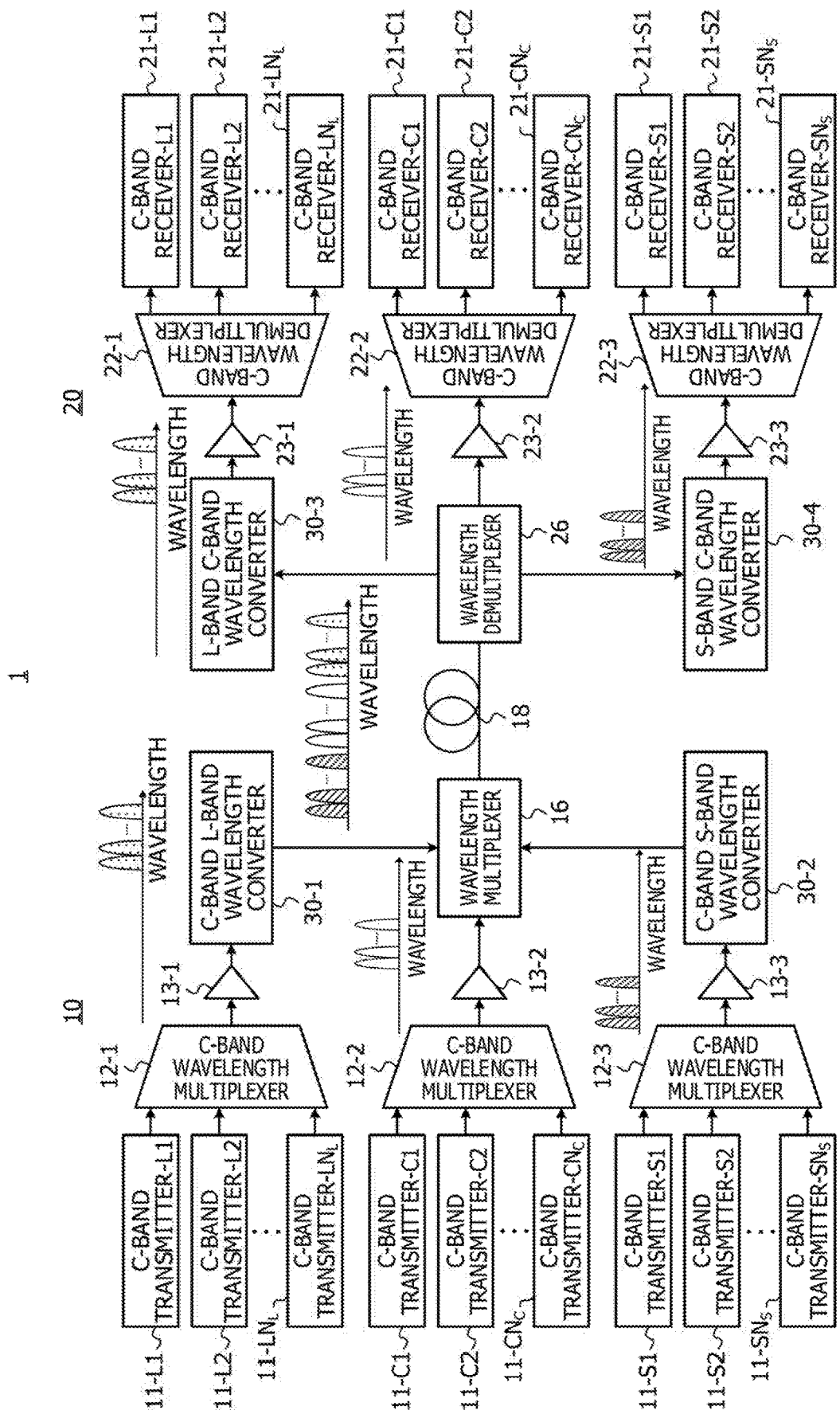
FIG. 2 is a schematic diagram of an optical transmission system to which an embodiment is applied.

FIG. 2 is a schematic diagram of a transmission system 1 according to the embodiment. The transmission system 1 includes an optical communication device 10 on the transmission side, an optical communication device 20 on the reception side, and an optical transmission path 18 coupling these optical communication devices 10 and 20. The optical communication device 10 and the optical communication device 20 each have both functions on the transmission side and the reception side. For the sake of explanation, the function on the transmission side of the optical communication device 10 and the function on the reception side of the optical communication device 20 are described by way of example.

The optical communication device 10 includes optical transmitters 11-L1 to 11-LN$_L$ included in a first group, optical transmitters 11-C1 to 11-CN$_C$ included in a second group, and optical transmitters 11-S1 to 11-SN$_S$ included in a third group (hereinafter referred to collectively as "optical transmitters 11" as appropriate). These optical transmitters 11 are each a photoelectric conversion front end circuit of an optical transponder, for example. The optical transmitters 11 have the same configuration and output signals having a wavelength channel of the C band (1530 to 1565 nm) (which are referred to as "C-band transmitter" in the drawings).

Output light of the optical transmitters 11-L1 to 11-LN$_L$ in the first group is multiplexed by a first wavelength multiplexer 12-1. Output light of the optical transmitters 11-C1 to 11-CN$_C$ in the second group is multiplexed by a second wavelength multiplexer 12-2. Output light of the optical transmitters 11-S1 to 11-SN$_S$ in the third group is multiplexed by a third wavelength multiplexer 12-3. The first wavelength multiplexer 12-1 to the third wavelength multiplexer 12-3 have the same function and configuration and multiplex inputted signals of multiple wavelength channels and output resultant signals.

Output of the first wavelength multiplexer 12-1 is amplified by a first optical amplifier 13-1. Output of the second wavelength multiplexer 12-2 is amplified by a second optical amplifier 13-2. Output of the third wavelength multiplexer 12-3 is amplified by a third optical amplifier 13-3. The first optical amplifier 13-1 to the third optical amplifier 13-3 have the same function and configuration and amplify multiplexed optical signals of the C-band.

The C-band signal light amplified by the first optical amplifier 13-1 is subjected to wavelength conversion by a first wavelength converter 30-1 and inputted to a wavelength multiplexer 16. In this example, the C-band signals are converted to L-band signals all together.

The C-band signal light amplified by the third optical amplifier 13-3 is subjected to wavelength conversion by a second wavelength converter 30-2 and inputted to the wavelength multiplexer 16. In this example, the C-band signals are converted to S-band signals all together.

The C-band signal light amplified by the second optical amplifier 13-2 is not subjected to wavelength conversion and is inputted to the wavelength multiplexer 16 as it is.

The wavelength multiplexer 16 multiplexes the L-band signal light, the C-band signal light, and the S-band signal light and outputs the resultant optical signal to the optical transmission path 18. This optical signal contains wavelength channels from the L-band to the S-band and optical communication over a wide band is carried out. The optical signal is propagated through the optical transmission path 18 and is received by the optical communication device 20.

The optical signal received by the optical communication device 20 is demultiplexed into L-band signal light, C-band signal light, and S-band signal light by a wavelength demultiplexer 26. The L-band signal light is converted to C-band signal light by a third wavelength converter 30-3, is amplified by an optical amplifier 23-1, and is demultiplexed into different wavelength channels by a first wavelength demultiplexer 22-1.

The S-band signal light is converted to C-band signal light by a fourth wavelength converter 30-4, is amplified by an optical amplifier 23-3, and is demultiplexed into different wavelength channels by a third wavelength demultiplexer 22-3. The C-band signal light is not subjected to wavelength conversion, is amplified by an optical amplifier 23-2 as it is, and is demultiplexed into different wavelength channels by a second wavelength demultiplexer 22-2.

The optical amplifiers 23-1 to 23-3 have the same function and configuration. The wavelength demultiplexers 22-1 to 22-3 have the same function and configuration and demultiplex C-band signal light into different wavelength channels, respectively.

The beams of signal light demultiplexed by the first wavelength demultiplexer 22-1 are supplied to optical receivers 21-L1 to 21-LN$_L$ in a first group. The beams of signal light demultiplexed by the second wavelength demultiplexer 22-2 are supplied to optical receivers 21-C1 to 21-CN$_C$ in a second group. The beams of signal light demultiplexed by the third wavelength demultiplexer 22-3 are supplied to optical receivers 21-S1 to 21-SN$_S$ in a third group. The optical receivers 21-L1 to 21-LN$_L$, the optical receivers 21-C1 to 21-CN$_C$, and the optical receivers 21-S1 to 21-SN$_S$ are referred to collectively as "optical receivers 21" as appropriate.

These optical receivers 21 are each a photoelectric conversion front end circuit of an optical transponder, for example. The optical receivers 21 have the same configuration and convert light having a wavelength channel of the C band (1530 to 1565 nm) to electric signals (which are referred to as "C-band receiver" in the drawings).

This transmission system does not use optical components for individual bands but uses common optical transmitters and receivers, wavelength multiplexers and demultiplexers, optical amplifiers, and the like. Using the wavelength converters 30-1 to 30-4 makes it possible to expand optical communication bands using the existing optical components.

Figure 3:
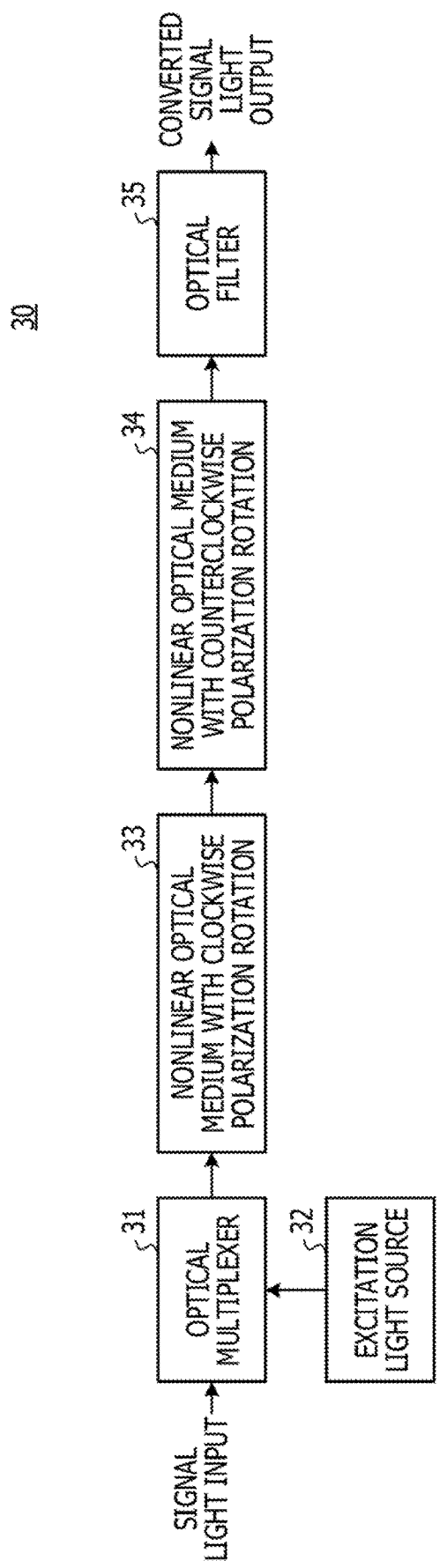
FIG. 3 is a schematic diagram of a wavelength converter of the embodiment.

FIG. 3 is a schematic diagram of a wavelength converter used as the wavelength converters 30 of the embodiment. Each wavelength converter 30 includes an optical multiplexer 31, an excitation light source 32, a first nonlinear optical medium 33, a second nonlinear optical medium 34, and an optical filter 35. The first nonlinear optical medium 33 and the second nonlinear optical medium 34 have properties different from each other, for example different signs.

Signal light having a central wavelength of vi is inputted to the optical multiplexer 31. The signal light to be inputted contains light having multiple wavelength channels, and the light having multiple wavelength channels is converted to different wavelength bands all together. Excitation light having a wavelength different from that of the inputted signal light is inputted from the excitation light source 32 to the optical multiplexer 31. The excitation light and the signal light are multiplexed and inputted to the first nonlinear optical medium 33. The phase of light having each wavelength channel contained in the signal light and the phase of the excitation light are assumed to match each other on the incidence plane of the first nonlinear optical medium 33.

The first nonlinear optical medium 33 is for example a nonlinear optical medium with clockwise polarization rotation. Converted signal light newly generated by the nonlinear optical effect is propagated in the first nonlinear optical medium 33 while receiving clockwise polarization rotation.

The input signal light, the excitation light, and the converted signal light, after being propagated a predetermined distance in the first nonlinear optical medium 33, are incident on the second nonlinear optical medium 34. The second nonlinear optical medium 34 is for example a nonlinear optical medium with counterclockwise polarization rotation. The input signal light, the excitation light, and the converted signal light are propagated in the second nonlinear optical medium 34 while receiving counterclockwise polarization rotation.

The output light of the second nonlinear optical medium 34 is incident on the optical filter 35. The input signal light and the excitation light are removed and only the converted signal light is outputted.

Figure 4:
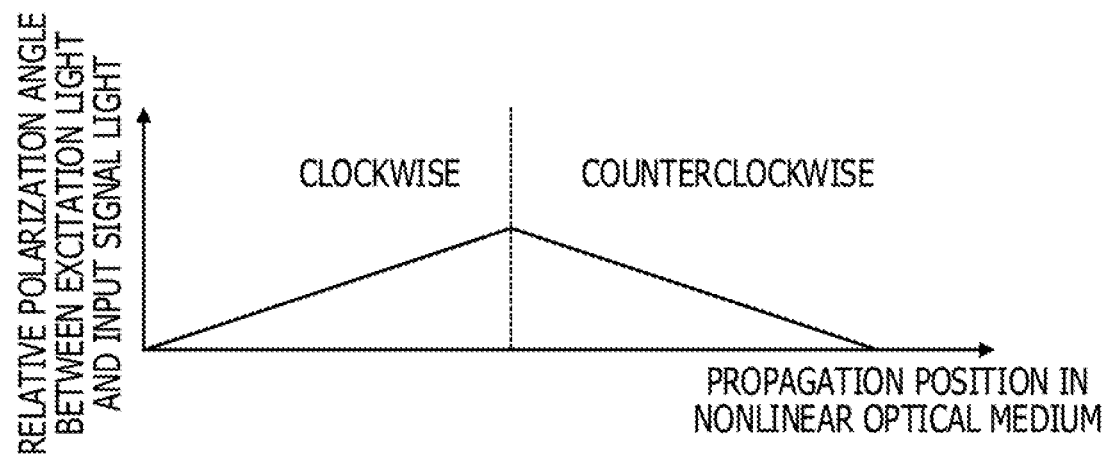
FIG. 4 is a schematic diagram for explaining the effect of the wavelength converter of the embodiment.

FIG. 4 is a schematic diagram for explaining the effect of the wavelength converter 30 of FIG. 3. The horizontal axis indicates the propagation position in the nonlinear optical medium, that is, the distance from the incidence plane of the first nonlinear optical medium 33, for example. It is assumed that the first nonlinear optical medium 33 and the second nonlinear optical medium 34 continue in the optical axis direction and the influence of the interface therebetween may be ignored.

The vertical axis indicates the relative polarization angle between the excitation light and the input signal light. When the excitation light and the input signal light are propagated in the nonlinear optical medium 33 with the clockwise polarization rotation, the relative polarization angle between the excitation light and the input signal light increases. When the excitation light and the input signal light are propagated in the nonlinear optical medium 34 with the counterclockwise polarization rotation, the relative polarization angle decreases, so that the relative polarization angle becomes minimum at the output plane of the second nonlinear optical medium 34.

This makes it possible to suppress a decrease in conversion efficiency due to the polarization mismatch or the polarization crosstalk.

Figure 5A:
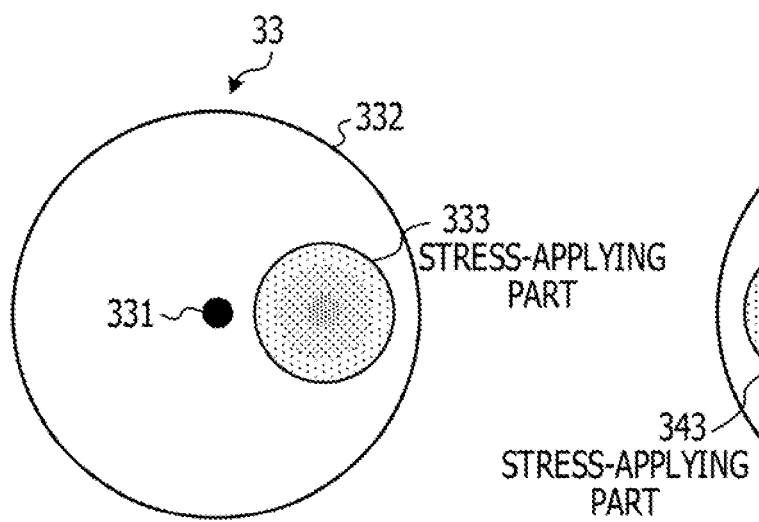
FIGS. 5A and 5B are diagrams illustrate examples of nonlinear optical media used in a wavelength converter.
Figure 5B:
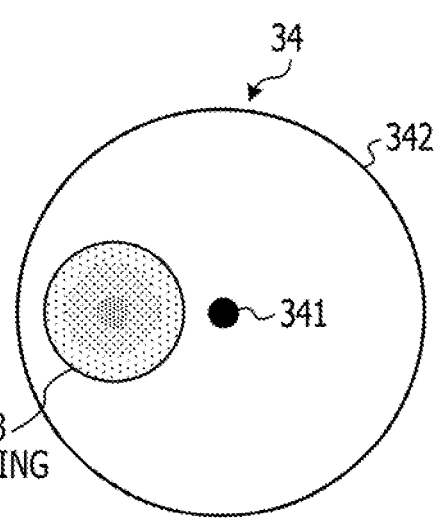

FIGS. 5A and 5B illustrate configuration examples of the nonlinear optical medium 33 and the nonlinear optical medium 34. In FIG. 5A, the first nonlinear optical medium 33 is an optical fiber of stress applying type, and is provided with a stress-applying part 333 at a certain position in a circumferential direction of a cladding 332 surrounding a core 331 in a cross section orthogonal to the optical axis.

The stress-applying part 333 applies stress to part of the circumference of the core 331. Since the polarization rotation is affected by the circularity of a core, the application of stress to a certain side of the circumference of the core 331 lowers the circularity of the cross-sectional shape of the core to generate the polarization rotation.

FIG. 5B is a cross-sectional view of the second nonlinear optical medium 34 as viewed from the same side as that in FIG. 5A. The second nonlinear optical medium 34 includes a stress-applying part 343 at a certain position in the circumferential direction of a cladding 342 surrounding a core 341 in a cross section orthogonal to the optical axis. The stress-applying part 343 is located at the opposite side of the core 341 from the stress-applying part 333 of the first nonlinear optical medium 33. Deflecting part of the circumference of the core 341 at a position on the opposite side from the deflection of the core 331 of the first nonlinear optical medium 33 causes the polarization rotation in an opposite direction from the first nonlinear optical medium 33.

The configurations of the first nonlinear optical medium 33 and the second nonlinear optical medium 34 are not limited to those illustrated in FIGS. 5A and 58B. For example, the first nonlinear optical medium 33 and the second nonlinear optical medium 34 may be achieved by processing the surface shape of the core of an elliptical-core polarization maintaining fiber. The first nonlinear optical medium 33 is made by making slightly smaller the radius of curvature of the ellipse of the elliptical core near one of the vertices along the major axis or the minor axis of the ellipse. The second nonlinear optical medium 34 is made by changing, near the second vertex at a position symmetrical to the first vertex with respect to the origin of the elliptical cross section of the core, the shape of the elliptical face like the first vertex. Changing the shape of the core surface at a position at the opposite side of the origin on the circumference of the ellipse in the same manner makes it possible to generate the clockwise polarization rotation and the counterclockwise polarization rotation.

Figure 6A:
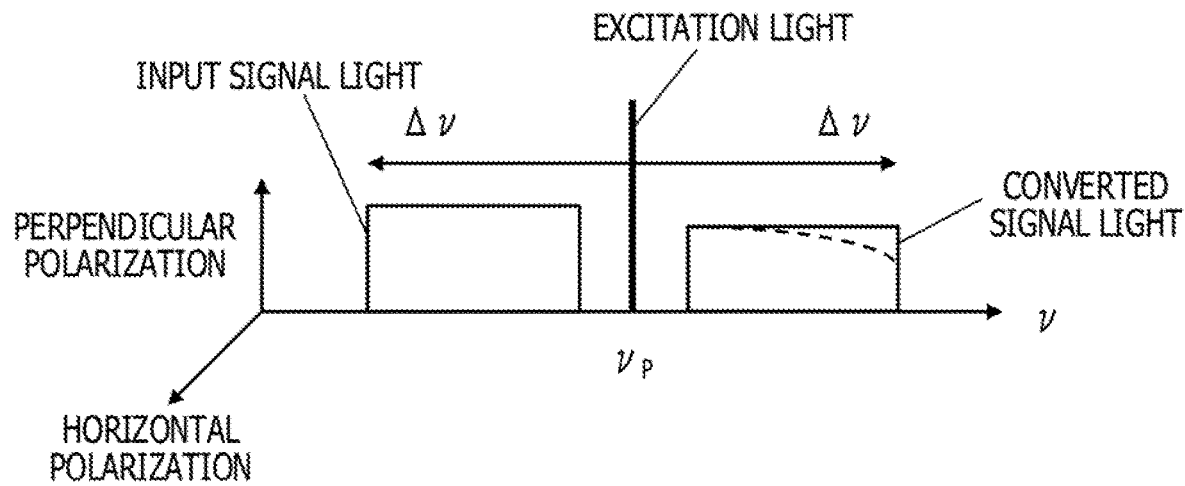
FIGS. 6A-6C are concept diagrams illustrating the effect of the embodiment in various wavelength conversion methods.
Figure 6B:
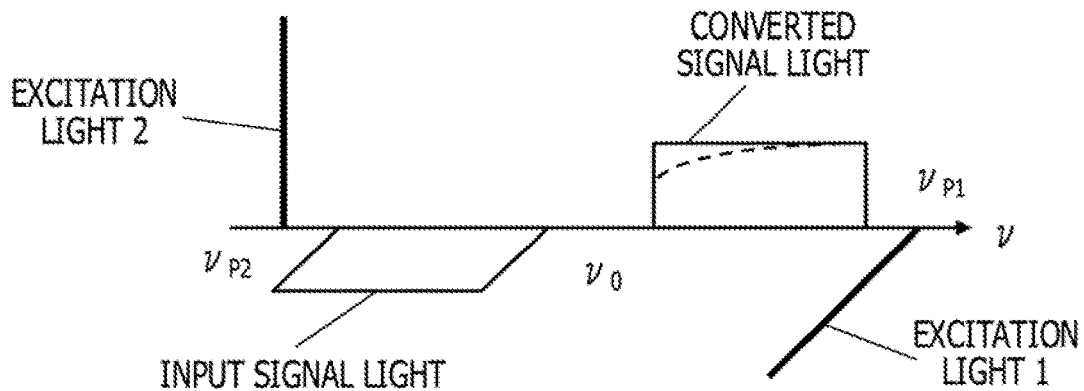
Figure 6C:
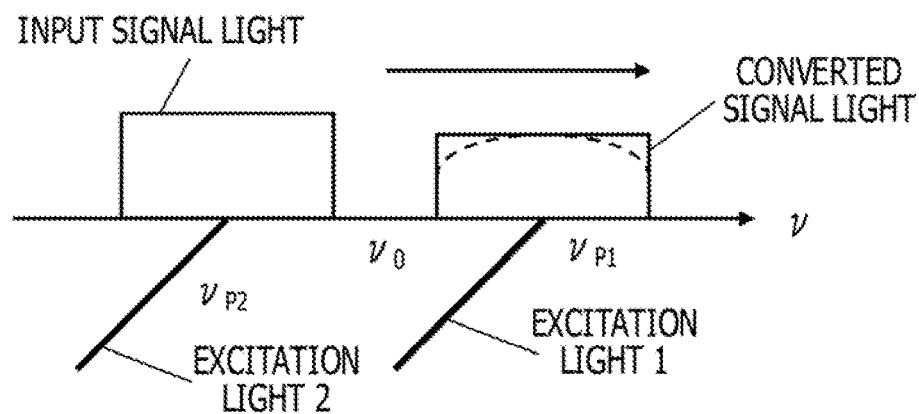

FIGS. 6A-6C is a concept diagram illustrating the effect of the embodiment in various wavelength conversion methods. FIG. 6A illustrates suppression of spectrum degradation of converted signal light in the wavelength conversion with a single wavelength of excitation light. FIG. 6B illustrates suppression of spectrum degradation of converted signal light in the wavelength conversion with orthogonally polarized two wavelengths of excitation light. FIG. 6C illustrates suppression of spectrum degradation of converted signal light in the wavelength conversion with parallel polarized two wavelengths of excitation light.

In the spectra of converted signal light in FIGS. 6A-C, the solid lines indicate spectra obtained in the embodiment, and dashed lines indicate spectra of converted signal light in the case of not employing the wavelength conversion configuration of the embodiment. In the wavelength conversion using the single wavelength of excitation light, excitation light having the same polarization direction as that of the incident signal light is made incident. Combining the first nonlinear optical medium 33 and the second nonlinear optical medium 34, which have different properties from each other, makes it possible to suppress spectrum degradation in end regions of converted signal light separated from the excitation light by $\Delta v$.

In FIG. 6B, first excitation light $v_{P1}$ having a frequency higher than that of the target converted signal light and second excitation light $v_{P2}$ having a frequency lower than that of the input signal light are made incident on a nonlinear optical medium. The polarization directions of the first excitation light $v_{P1}$ and the second excitation light $v_{P2}$ are orthogonal to each other. The polarization direction of the input signal light is the same as the polarization direction of the first excitation light $v_{P1}$ and is orthogonal to the polarization direction of the second excitation light $v_{P2}$. The polarization direction of the generated converted signal light is orthogonal to the polarization direction of the input signal light and is also orthogonal to the polarization direction of the first excitation light $v_{P1}$.

In the configuration that does not compensate for wavelength dispersion or frequency-dependent polarization rotation, the spectrum of the converted signal light is degraded in an end region closer to the zero dispersion wavelength $v_0$. In contrast, combining the first nonlinear optical medium 33 and the second nonlinear optical medium 34 having opposite properties to compensate for wavelength dispersion or frequency-dependent polarization rotation as in the embodiment makes it possible to maintain the conversion efficiency over a wide band.

In FIG. 6C, first excitation light $v_{P1}$ near the central wavelength of the target converted signal light and second excitation light $v_{P2}$ near the central wavelength of the input signal light are made incident on a nonlinear optical medium. The polarization directions of the first excitation light $v_{P1}$ and the second excitation light $v_{P2}$ are the same. The polarization direction of the incident signal light and the polarization direction of the second excitation light $v_{P2}$ are orthogonal to each other. The polarization direction of the generated converted signal light is the same as the polarization direction of the input signal light and is orthogonal to the polarization direction of the first excitation light $v_{P1}$.

In the configuration that does not compensate for wavelength dispersion or frequency-dependent polarization rotation, the spectrum of the converted signal light is degraded in both of a spectrum end closer to the zero dispersion wavelength $v_0$ and a spectrum end away from the zero dispersion wavelength $v_0$. In contrast, combining the first nonlinear optical medium 33 and the second nonlinear optical medium 34 having opposite properties to compensate for wavelength dispersion or frequency-dependent polarization rotation as in the embodiment makes it possible to maintain the conversion efficiency over a wide band.

<1: Compensation for Polarization Rotation with Wavelength Conversion Using a Single Wavelength of Excitation Light>

Figure 7:
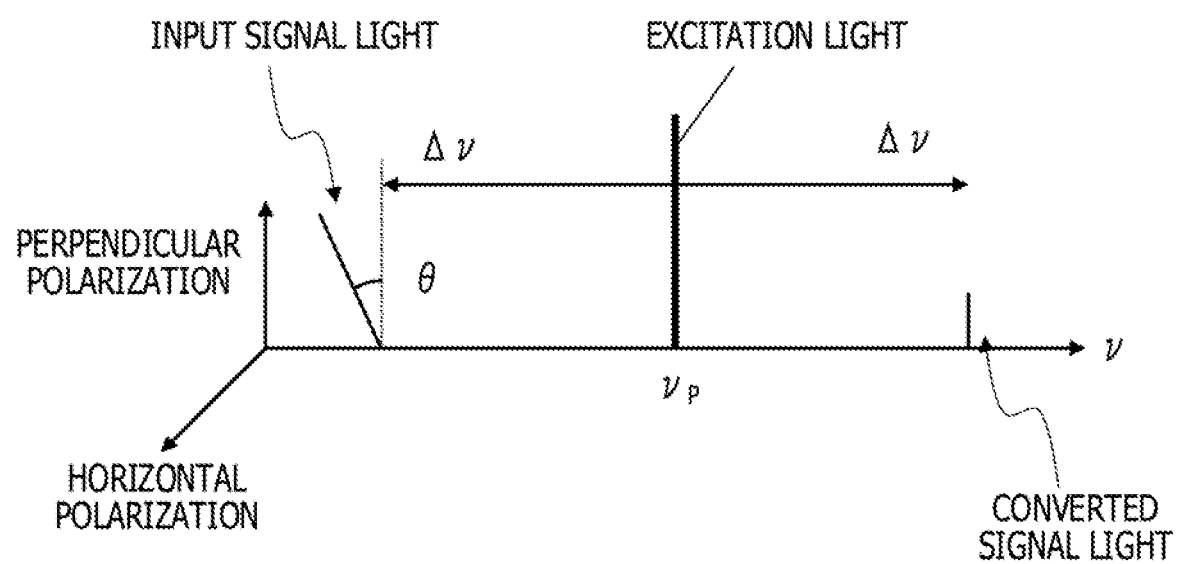
FIG. 7 is a diagram for explaining the compensation for polarization rotation with wavelength conversion using a single wavelength of excitation light.

FIG. 7 is a diagram for explaining the compensation for a decrease in efficiency due to the polarization rotation with the wavelength conversion using a single wavelength of excitation light. It is desirable that the polarization direction of the input signal light is the same as the polarization direction of the excitation light $v_P$. The polarization plane of light propagating in a nonlinear optical medium rotates depending on the frequency. The rotation angle from the polarization direction of excitation light at this time is $\theta(v)$.

The frequency-dependent polarization rotation is defined by Formula (1) as a function of a differential group delay (DGD) between polarizations and a polarization state depolarization (PSD).

[Math. 1]

$$\theta(v) = \frac{1}{2}\frac{PSD}{DGD}\Delta v \quad (1)$$

The efficiency ratio $\Delta\eta$ depending on the presence or absence of polarization rotation generated in the longitudinal direction or the optical axis direction of a nonlinear optical medium having a length of L is a ratio of the value of integral of the conversion efficiency $\eta_R$ per unit length "l" when there is polarization rotation to the value of integral of the conversion efficiency $\eta_{NR}$ per unit length "l" when there is no polarization rotation and is expressed by Formula (2).

[Math. 2]

$$\Delta\eta = \frac{\left(\int_0^L \eta_R(l)dl\right)^2}{\left(\int_0^L \eta_{NR}dl\right)^2} \quad (2)$$

When it is assumed that the polarization rotates in proportion to the length, the relation between $\eta_R$ and $\eta_{NR}$ is expressed by Formula (3).

[Math. 3]

$$\eta_R = \eta_{NR}\cos\theta \quad (3)$$

where $\theta = kl$, which represents the rotation angle at the exit end. "l" represents the unit length.

When Formula (3) is plugged in Formula (2), Formula (4) is obtained.

[Math. 4]

$$\Delta\eta = \frac{\left(\int_0^{\theta_s} \eta_{NR}\cos\theta d\theta\right)^2}{\left(\int_0^{\theta_s} \eta_{NR}d\theta\right)^2} = \frac{\sin^2\theta_s}{\theta_s^2} \quad (4)$$

To maintain the efficiency ratio $\Delta\eta$ at $\Delta\eta > 0.5$, from Formula (4), Formula (5) is obtained.

[Math. 5]

$$\frac{\sin^2\theta_s}{\theta_s^2} > 0.5 \quad (5)$$

$$\theta_s < 1.39$$

When Formula (5) is plugged in Formula (1), Formula (6) is obtained.

[Math. 6]

$$\frac{PSD}{DGD} < \frac{2.78}{\Delta v} \quad (6)$$

For example, to perform wavelength conversion under a condition of the efficiency ratio $\Delta\eta > 0.5$ over a band of 5 THz, $\Delta v = 5$ THz is plugged in Formula (6) and Formula (7) has to be satisfied.

[Math. 7]

$$\frac{PSD}{DGD} < 0.56 \text{ ps} \quad (7)$$

That is, the wavelength converter is designed such that PSD/DGD becomes smaller than 0.56 ps, for example.

On the other hand, in the configuration of FIG. 3 of the embodiment, in the case where the nonlinear optical medium 33 with clockwise frequency-dependent polarization rotation and the nonlinear optical medium 34 with counterclockwise frequency-dependent polarization rotation are combined to perform wavelength conversion with a single wavelength of excitation light, Formula (2) is expanded to Formula (8).

[Math. 8]

$$\Delta\eta = \left(\frac{\left|\int_0^{L_1}\eta_{R1}(l)dl\right| + \left|\int_0^{L_2}\eta_{NR2}dl\right|}{\left|\int_0^{L_1}\eta_{NR1}dl\right| + \left|\int_0^{L_2}\eta_{NR2}dl\right|}\right)^2 \quad (8)$$

L1 is the length of the nonlinear optical medium 33 with clockwise frequency-dependent polarization rotation, and L2 is the length of the nonlinear optical medium 34 with counterclockwise frequency-dependent polarization rotation. The total length L of the nonlinear optical media thus combined is L=L1+L2.

When it is assumed that polarization rotation occurs in proportion to the length of each of the nonlinear optical medium 33 and the nonlinear optical medium 34, Formula (9) is obtained.

[Math. 9]

$$\eta_{R1} = \eta_{NR1}\cos\theta_1$$

$$\eta_{R2} = \eta_{NR2}\cos\theta_2 \quad (9)$$

$\theta_1 = k_1 l$, and $\theta_2 = k_2 l$.

When Formula (9) is plugged in Formula (8), Formula (10) is obtained.

[Math. 10]

$$\Delta\eta = \left(\frac{\left|\int_0^{\theta_1}\eta_{NR1}\cos\theta d\theta\right| + \left|\int_{\theta_1}^{\theta_1+\theta_2}\eta_{NR2}\cos\theta d\theta\right|}{\left|\int_0^{\theta_1}\eta_{NR1}d\theta\right| + \left|\int_{\theta_1}^{\theta_1+\theta_2}\eta_{NR2}d\theta\right|}\right)^2 \quad (10)$$

$$= \left(\frac{|\sin\theta_1| + |\sin(\theta_1+\theta_2) - \sin\theta_1|}{|\theta_1| + |\theta_2|}\right)^2$$

When $\theta_1=-\theta_2=\theta_S/2$, Formula (10) is transformed into Formula

[Math. 11]

$$\Delta\eta = \frac{\sin^2\frac{\theta_S}{2}}{\left(\frac{\theta_S}{2}\right)^2} \qquad (11)$$

When Formula (11) is compared with Formula (4), combining the nonlinear optical medium 33 with clockwise frequency-dependent polarization rotation and the nonlinear optical medium 34 with counterclockwise frequency-dependent polarization rotation makes it possible to compensate for frequency-dependent polarization rotation. That is, as compared with the existing wavelength conversion, it is possible to set the efficiency ratio or PSD/DGD to the same level even when polarization rotation per unit length is twice as large, thus relieving the demand for wavelength conversion, for example.

<2: Compensation for Crosstalk Degradation Due to Polarization Rotation with Wavelength Conversion Using Two Beams of Excitation Light>

Figure 8A:
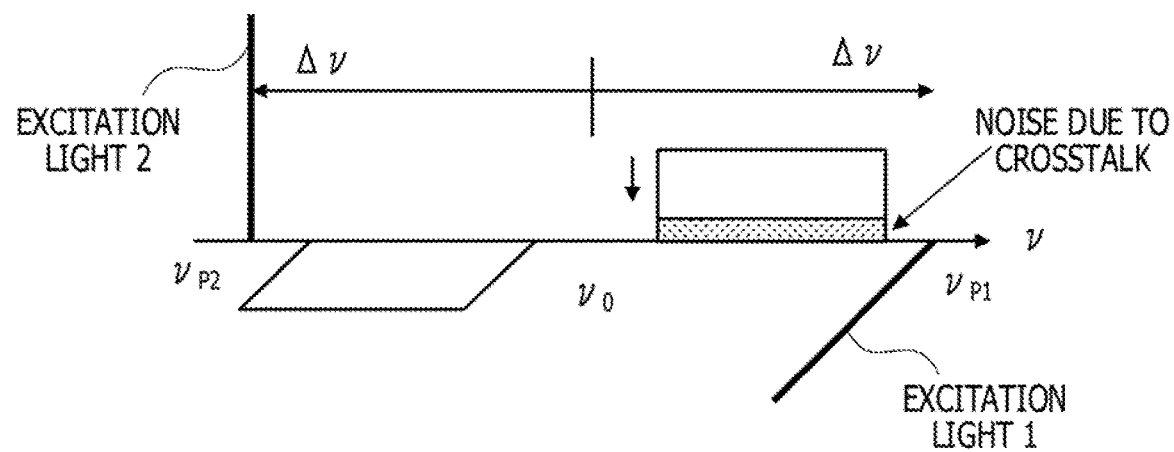
FIGS. 8A and 8B are diagrams for explaining compensation for polarization crosstalk with wavelength conversion using orthogonally polarized two wavelengths of excitation light and parallel polarized two wavelengths of excitation light.
Figure 8B:
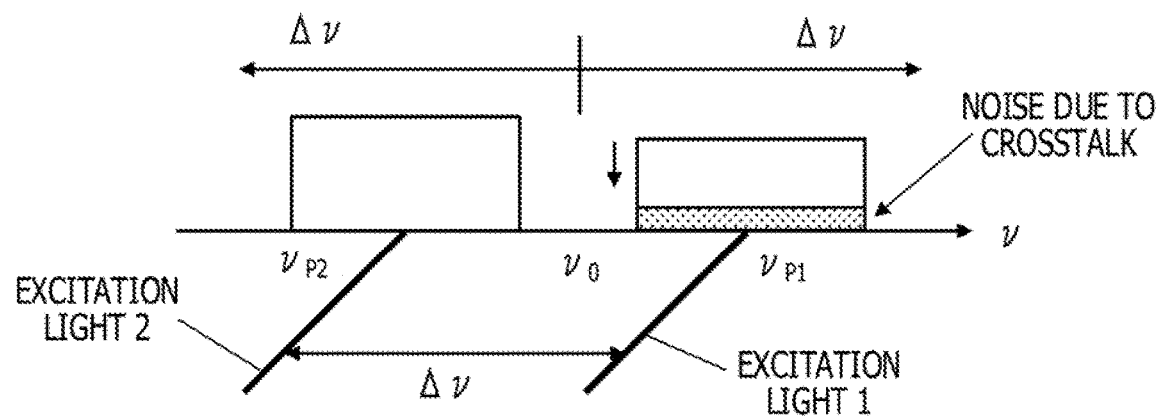

FIG. 8A is a diagram for explaining compensation for polarization crosstalk when using orthogonally polarized two wavelengths of excitation light, and FIG. 8B is a diagram for explaining compensation for polarization crosstalk when using parallel polarized two wavelengths of excitation light. In both of the case of orthogonally polarized two wavelengths of excitation light and the case of parallel polarized two wavelengths of excitation light, polarization crosstalk is generated by polarization rotation between the two beams of excitation light, so that noise is contained in converted signal light, degrading the signal quality.

The polarization crosstalk XT due to polarization rotation between two beams of excitation light where polarization rotation is generated in the longitudinal direction of a nonlinear optical medium is expressed by Formula (12).

[Math. 12]

$$XT = \frac{\left(\int_0^L \eta_{ROrth}(l)dl\right)^2}{\left(\int_0^L \eta_{RPara}(l)dl\right)^2} \qquad (12)$$

The crosstalk XT of Formula (12) is represented by a ratio between the "integral of the component efficiency $\eta_{ROrth}$ per unit length generated by interaction between orthogonal polarization components generated by the rotation" and the "integral of the component efficiency $\eta_{RPara}$ per unit length generated by interaction between parallel polarization components that do not rotate". The orthogonal polarization components and the parallel polarization components mentioned herein refer to components orthogonal to the polarization of incident light and components parallel to the polarization of incident light.

When it is assumed that the polarization rotates in proportion to the length, Formula (13) is obtained.

[Math. 13]

$\eta_{ROrth}=\eta_{NR}\sin\theta$ $\eta_{RPara}=\eta_{NR}\cos\theta$ \qquad (13)

$\theta=kl$.

When Formula (13) is plugged in Formula (12), Formula (14) is obtained.

[Math. 14]

$$XT = \frac{\left(\int_0^{\theta_d}\sin\theta d\theta\right)^2}{\left(\int_0^{\theta_d}\cos\theta d\theta\right)^2} = \frac{(1-\cos\theta_d)^2}{\sin^2\theta_d} \qquad (14)$$

To suppress the crosstalk XT to 0.01 or less, the condition of Formula (15) has to be satisfied.

[Math. 15]

$$\frac{(1-\cos\theta_d)^2}{\sin^2\theta_d} < 0.01 \qquad (15)$$

$\theta_d < 0.20$

When Formula (15) is plugged in Formula (1), Formula (16) is obtained.

[Math. 16]

$$\frac{PSD}{DGD} < \frac{0.40}{\Delta v} \qquad (16)$$

For example, the condition for performing wavelength conversion at a efficiency ratio of $\Delta\eta>0.5$ over a band of 5 THz is different depending on the arrangement of two beams of excitation light. In the case of wavelength conversion using parallel polarized two wavelengths of excitation light, since the difference in frequency between the two beams of excitation light is approximately 5 THz (see FIG. 6C), by plugging $\Delta v=5$ THz in Formula (16), the condition of Formula (17) is obtained.

[Math. 17]

$$\frac{PSD}{DGD} < 0.08 \text{ ps} \qquad (17)$$

The wavelength converter has to be designed to satisfy PSD/DGD<0.08 ps.

In the case of using orthogonally polarized two wavelengths of excitation light, since the difference in frequency between the two beams of excitation light is approximately 10 THz, which is 2 by 5 THz (see FIG. 6B), by plugging $\Delta v=10$ THz in Formula (16), the condition of Formula (18) is obtained.

[Math. 18]

$$\frac{PSD}{DGD} < 0.04 \text{ ps} \qquad (18)$$

The wavelength converter has to be designed to satisfy PSD/DGD<0.04 ps.

On the other hand, as in the embodiment of FIG. 3, in the configuration where the nonlinear optical medium 33 with clockwise frequency-dependent polarization rotation and the nonlinear optical medium 34 with counterclockwise frequency-dependent polarization rotation are combined to perform wavelength conversion with two beams of excitation light, Formula (12) is expanded to Formula (19).

[Math. 19]

$$\Delta\eta = \left(\frac{\left|\int_0^{L_1} \eta_{ROrth1}(l)dl\right| + \left|\int_0^{L_2} \eta_{ROrth2}(l)dl\right|}{\left|\int_0^{L_1} \eta_{RPara1}(l)dl\right| + \left|\int_0^{L_2} \eta_{RPara2}(l)dl\right|}\right)^2 \quad (19)$$

L1 is the length of the nonlinear optical medium 33 with clockwise frequency-dependent polarization rotation, and L2 is the length of the nonlinear optical medium 34 with counterclockwise frequency-dependent polarization rotation. The total length L of the nonlinear optical media thus combined is L=L1+L2.

When it is assumed that polarization rotation occurs in proportion to the length of each of the nonlinear optical medium 33 and the nonlinear optical medium 34, Formula (20) is obtained.

[Math. 20]

$\eta_{ROrth1} = \eta_{NR1} \sin\theta_1$ $\eta_{RPara1} = \eta_{NR1} \cos\theta_1$ $\eta_{ROrth2} = \eta_{NR2} \sin\theta_2$ $\eta_{RPara2} = \eta_{NR2} \cos\theta_2$ (20)

$\theta_1 = k_1 l$, and $\theta_2 = k_2 l$.

When Formula (20) is plugged in Formula (19), the crosstalk XT is expressed by Formula (21).

[Math. 21]

$$XT = \left(\frac{\left|\int_0^{\theta_1} \sin\theta d\theta\right| + \left|\int_{\theta_1}^{\theta_1+\theta_2} \sin\theta d\theta\right|}{\left|\int_0^{\theta_1} \cos\theta d\theta\right| + \left|\int_{\theta_1}^{\theta_1+\theta_2} \cos\theta d\theta\right|}\right)^2 \quad (21)$$

$$= \left(\frac{|1-\cos\theta_1| + |-\cos(\theta_1+\theta_2)+\cos\theta_1|}{|\sin\theta_1| + |\sin(\theta_1+\theta_2)-\sin\theta_1|}\right)$$

When $\theta_1 = -\theta_2 = \theta_d/2$, Formula (21) is transformed into Formula (22).

[Math. 22]

$$XT = \left(\frac{1-\cos\frac{\theta_d}{2}}{\sin\frac{\theta_d}{2}}\right)^2 \quad (22)$$

When Formula (22) is compared with Formula (14), combining the nonlinear optical medium 33 with clockwise frequency-dependent polarization rotation and the nonlinear optical medium 34 with counterclockwise frequency-dependent polarization rotation makes it possible to suppress the crosstalk to the same level even when the polarization rotation per unit length is twice as large, as compared with the existing configuration. That is, demanded values in the design of a wavelength converter are relieved, for example.

<3: Compensation for a Decrease in Efficiency Due to Wavelength Dispersion with a Single Wavelength of Excitation Light and Orthogonally Polarized Two Wavelengths of Excitation Light>

When the propagation loss is sufficiently small, the difference in propagation constant $\Delta\beta$ among excitation light $v_{P1}$ excitation light $v_{P2}$, signal light having a central frequency of $v_S$, and converted light having a central frequency of $v_C$ is expressed by Formula (23).

[Math 23]

$$\Delta\beta = \beta(v_{P1}) + \beta(v_{P2}) - \beta(v_S) - \beta(v_C) \quad (23)$$

The decrease in efficiency caused by phase mismatch $\Delta\beta L$ generated in a nonlinear optical medium having a length of L due to the difference in propagation constant $\Delta\beta$, that is, the efficiency ratio $\Delta\eta$ is expressed by Formula (24), for example.

[Math. 24]

$$\Delta\eta = \frac{\sin^2(\Delta\beta L/2)}{(\Delta\beta L/2)^2} \quad (24)$$

The propagation constant $\beta$ is a function of a frequency, and the Taylor expansion around $v_0$ is expressed by Formula (25) when fifth-order or more terms are ignored.

[Math. 25]

$$\beta(v) = \beta + \frac{d\beta}{dv}(v-v_0) + \quad (25)$$
$$\frac{1}{2}\frac{d^2\beta}{dv^2}(v-v_0)^2 + \frac{1}{6}\frac{d^3\beta}{dv^3}(v-v_0)^3 + \frac{1}{24}\frac{d^4\beta}{dv^4}(v-v_0)^4$$

where $v_0$ is a zero-dispersion frequency (second-order dispersion is zero) of a nonlinear optical media.

In the case of a single wavelength of excitation light, when the excitation light frequency and the zero-dispersion frequency are made coincident ($v_0 = v_P$), the average of the frequency $v_S$ of signal light and the frequency $v_C$ of converted light coincides with the zero-dispersion frequency ($v_0 = (v_S + v_C)/2$), and the difference in propagation constant $\Delta\beta$ is expressed by Formula (26) where terms other than the fourth-order term are canceled out.

[Math. 26]

$$\Delta\beta = \beta(v_{P1}) + \beta(v_{P2}) - \beta(v_S) - \beta(v_C) = -\frac{1}{12}\frac{d^4\beta}{dv^4}(v_S - v_0)^4 \quad (26)$$

When the band of $\Delta v$ is converted, the efficiency is the lowest when $v_S = v_0 \pm \Delta v$, and Formula (26) is transformed into Formula (27).

[Math. 27]

$$\Delta\beta = -\frac{1}{12}\frac{d^4\beta}{dv^4}\Delta v^4 \quad (27)$$

In the case of wavelength conversion using orthogonally polarized two wavelengths of excitation light, when the average value of the frequencies of the two excitation light beams and the zero-dispersion frequency are made coincident ($v_0=(v_{P1}+v_{P2})/2$), the average of the frequency $v_S$ of signal light and the frequency $v_C$ of converted light coincides with the zero-dispersion frequency ($v_0=(v_S+v_C)/2$), and the difference in propagation constant $\Delta\beta$ is expressed by Formula (28) where terms other than the fourth-order term are canceled out.

[Math. 28]
$$\Delta\beta = \frac{1}{12}\frac{d^4\beta}{dv^4}\{(v_{P1}-v_0)^4 - (v_S-v_0)^4\} \tag{28}$$

When the band of $\Delta v$ is converted, the efficiency is the lowest when $v_S=v_0$ and $v_{P1,2}=v_0\pm\Delta v$, which is equal to Formula (27).

In either case of a single wavelength of excitation light and orthogonally polarized two wavelengths of excitation light, to suppress the efficiency ratio to $\Delta\eta>0.5$, the absolute value of the fourth derivative of the propagation constant $\beta$ with the frequency v has to satisfy the condition of Formula (29) which is obtained by plugging Formula (27) in Formula (24).

[Math. 29]
$$\left|\frac{d^4\beta}{dv^4}\right| < \frac{33.40}{\Delta v^4 L} \tag{29}$$

For example, to convert a band of 5 THz with a nonlinear optical medium of 100 m, Formula (30) has to be satisfied.

[Math. 30]
$$\left|\frac{d^4\beta}{dv^4}\right| < 5.34 \cdot 10^{-52}(s^4/m) = 0.534(ps^4/km) \tag{30}$$

In contrast, combining a nonlinear optical medium having a length of 50 m with which the value of the fourth derivative $d_4\beta/dv^4$ is positive and a nonlinear optical medium having a length of 50 m with which the value of the fourth derivative is negative as in the embodiment makes it possible to relieve the demanded value as described later.

<4: Compensation for a Decrease in Efficiency Due to Wavelength Dispersion with Parallel Polarized Two Wavelengths of Excitation Light>

When the zero-dispersion frequency (second-order dispersion is zero) of a nonlinear optical medium is $v_0$ and the average value of the frequencies of the two excitation light beams and the zero-dispersion frequency are made coincident ($v_0=(v_{P1}+v_{P2})/2$, $v_{P1}=v_0-\Delta v/2$, $v_{P2}=v_0+\Delta v/2$), and the frequency $v_C$ of converted light is $v_C=v_S+\Delta v$. When the band of $\Delta v$ is converted, the efficiency is the lowest when $v_S=v_0$ or $v_S=v_0-\Delta v$.

When the fourth-order derivative is sufficiently small, the difference in propagation constant $\Delta\beta$ is expressed by Formula (31) from Formula (25) where terms other than the third-order term is canceled out.

[Math. 31]
$$\Delta\beta = \beta(v_{P1}) + \beta(v_C) - \beta(v_{P2}) - \beta(v_S) = \frac{\Delta v^3}{8}\frac{d^3\beta}{dv^3} \tag{31}$$

To maintain the efficiency ratio at $\Delta\eta>0.5$, the absolute value of the third derivative of the propagation constant $\beta$ with the frequency v has to satisfy the condition of Formula (32). Formula (32) is obtained by plugging Formula (24) in Formula (31).

[Math. 32]
$$\left|\frac{d^3\beta}{dv^3}\right| < \frac{22.24}{\Delta v^3 L} \tag{32}$$

For example, to convert a band of 5 THz with a nonlinear optical medium of 100 m, the wavelength converter has to be designed to satisfy Formula (33).

[Math. 33]
$$\left|\frac{d^3\beta}{dv^3}\right| < 1.78 \cdot 10^{-39}(s^3/m) = 1.78(ps^3/km) \tag{33}$$

Combining nonlinear optical media having different, positive and negative, dispersions as in the embodiment makes it possible to relieve the demand in design as described below.

That is, for example, in the case where the nonlinear optical medium 33 having a length of $L_1$ in the optical axis direction and a propagation constant of $\beta_1$ and a nonlinear optical medium 34 having a length of $L_2$ and a propagation constant of $\beta_2$ are combined ($L_1+L_2=L$), Formula (24) is expanded to Formula (34).

[Math. 34]
$$\Delta\eta = \left[\frac{|\sin(\Delta\beta_1 L_1/2)| + |\sin(\Delta\beta_1 L_1/2 + \Delta\beta_2 L_2/2) - |^2}{|\Delta\beta_1 L_1/2| + |\Delta\beta_2(L_1+L_2)/2 - \Delta\beta_2 L_2/2|}\right] \tag{34}$$

When $\Delta\beta=-\Delta\beta_2=\Delta\beta p$, $L_1=L_2=L/2$, the efficiency ratio $\Delta\eta$ is expressed by Formula (35).

[Math. 35]
$$\Delta\eta = \left[\frac{\sin(\Delta\beta_p L/4)}{(\Delta\beta_p L/4)}\right]^2 \tag{35}$$

$\Delta\beta p$ is a function of only the fourth-order dispersion in the case of wavelength dispersion with a single wavelength of excitation light and orthogonally polarized two wavelengths of excitation light, and is a function of only the third-order dispersion in the case of wavelength dispersion with parallel polarized two wavelengths of excitation light. When Formula (35) is compared with Formula (24), combining nonlinear optical media having a positive dispersion value and a negative dispersion value as in the embodiment makes it possible to relieve the demand as compared with the case of using a single nonlinear optical medium. Specifically, it is possible to suppress a decrease in efficiency due to the crosstalk to the same level even when the fourth-order dispersion or the third-order dispersion per unit length is twice those of Formula (29) or Formula (32), for example.

Figure 9:
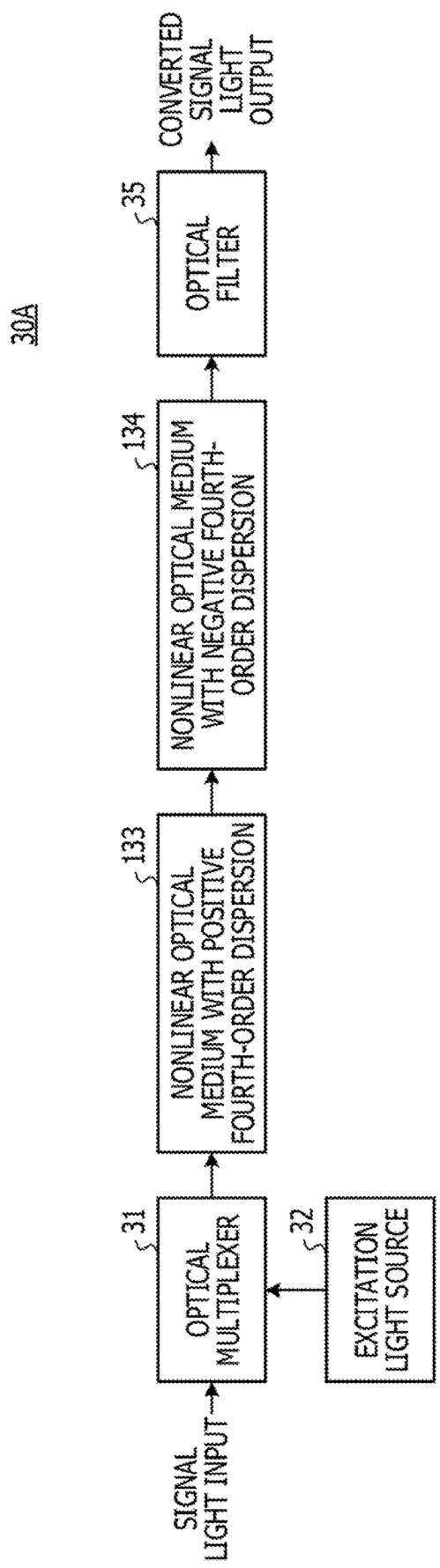
FIG. 9 is a diagram illustrating a modification of the wavelength converter of the embodiment.

FIG. 9 is a schematic diagram of a wavelength converter 30A. The wavelength converter 30A is applied to wavelength conversion using a single wavelength of excitation light and orthogonally polarized two wavelengths of excitation light, and compensates for spectrum degradation due to fourth-order dispersion as described above.

The wavelength converter 30A includes an optical multiplexer 31, an excitation light source 32, a first nonlinear optical medium 133 having a positive fourth-order dispersion value, a second nonlinear optical medium 134 having a negative fourth-order dispersion value, and an optical filter 35. The length of the first nonlinear optical medium 133 and the length of the second nonlinear optical medium 134 in the optical axis direction are designed such that the relative differential group delay or the phase mismatch between incident light and converted signal light becomes minimum at the exit plane of the second nonlinear optical medium.

The order of arrangement of the nonlinear optical medium 133 having a positive fourth-order dispersion value and the nonlinear optical medium 134 having a negative fourth-order dispersion value may be reversed. Two sets or more of nonlinear optical media may be used and arranged such that positive and negative fourth-order dispersion values are arranged alternately.

This wavelength converter 30A allows fourth-order dispersion having a size twice that of the case of using a single nonlinear optical medium at the same efficiency ratio (or a decrease in efficiency).

Figure 10:
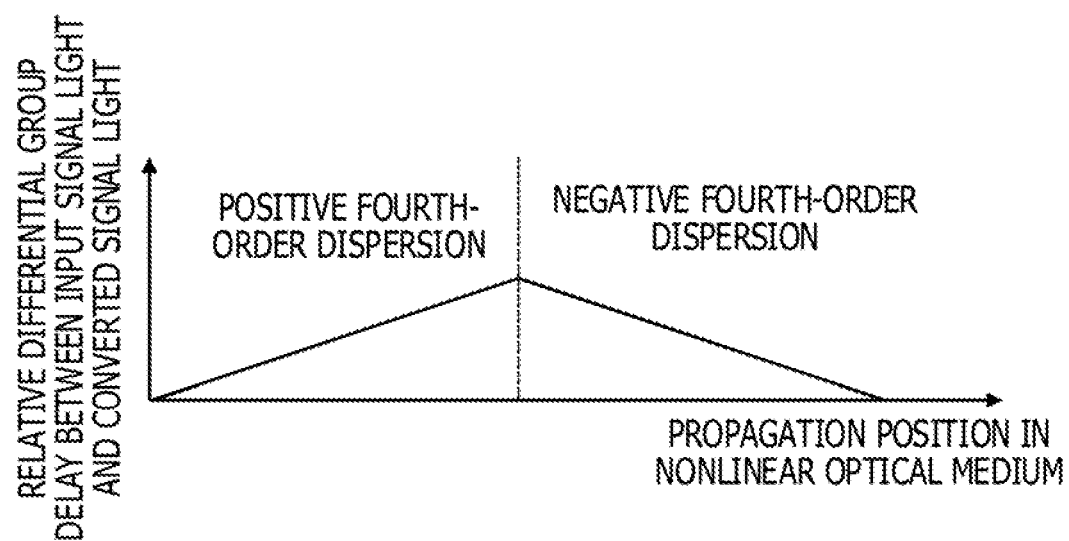
FIG. 10 is a schematic diagram for explaining the effect of the wavelength converter of FIG. 9.

FIG. 10 is a diagram for explaining the effect of the wavelength converter 30A of FIG. 9. The horizontal axis indicates the propagation position in the nonlinear optical medium, that is, the distance from the incidence plane of the first nonlinear optical medium 133, for example. It is assumed that the first nonlinear optical medium 133 and the second nonlinear optical medium 134 continue in the optical axis direction and the influence of the interface therebetween may be ignored.

The vertical axis indicates the relative differential group delay between input signal light and converted signal light. As propagation in the first nonlinear optical medium 133 proceeds, the relative differential group delay increases upon the influence of fourth-order dispersion, and phase deviation between the input signal light and the converted signal light increases. However, propagation in the second nonlinear optical medium 134 having a fourth-order dispersion value of the opposite sign reduces the relative differential group delay, so that the relative differential group delay becomes minimum at the output plane of the second nonlinear optical medium 134.

This makes it possible to suppress a decrease in conversion efficiency due to phase mismatch between light waves.

Figure 11:
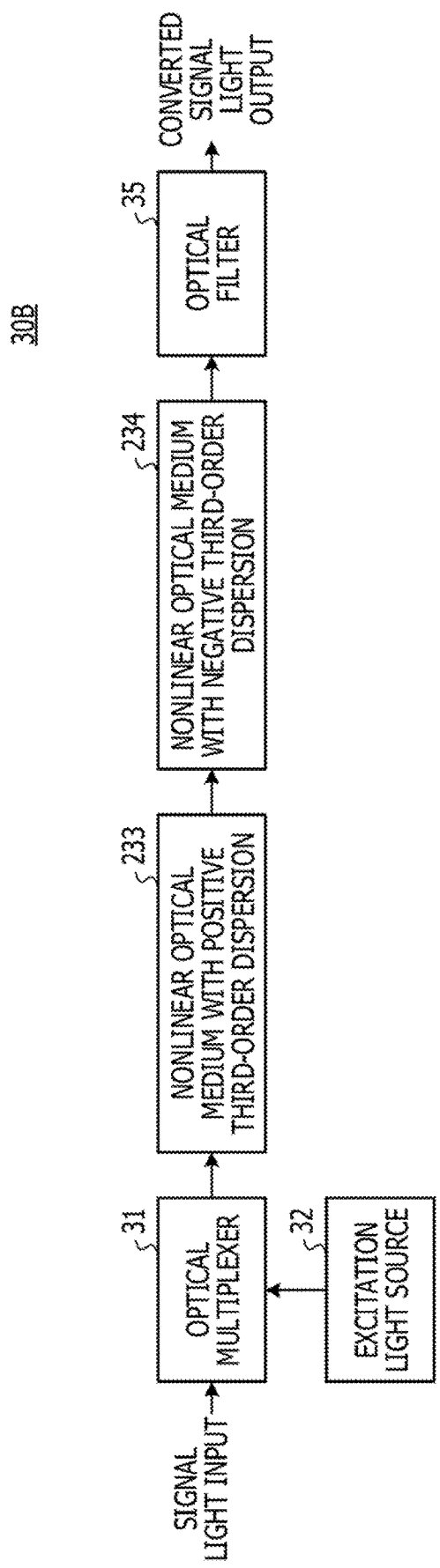
FIG. 11 is a diagram illustrating another modification of the wavelength converter of the embodiment.

FIG. 11 is a schematic diagram of a wavelength converter 30B. The wavelength converter 30B is applied to wavelength conversion using parallel polarized two wavelengths of excitation light, and compensates for spectrum degradation due to third-order dispersion as described above.

The wavelength converter 30B includes an optical multiplexer 31, an excitation light source 32, a first nonlinear optical medium 233 having a positive third-order dispersion value, a second nonlinear optical medium 234 having a negative third-order dispersion value, and an optical filter 35. The length of the first nonlinear optical medium 233 and the length of the second nonlinear optical medium 234 in the optical axis direction are designed such that the relative differential group delay or the phase mismatch between incident light and converted signal light becomes minimum at the exit plane of the second nonlinear optical medium.

The order of arrangement of the nonlinear optical medium 233 having a positive third-order dispersion value and the nonlinear optical medium 234 having a negative third-order dispersion value may be reversed. Two sets or more of nonlinear optical media may be used and arranged such that positive and negative third-order dispersion values are arranged alternately.

This wavelength converter 30B allows third-order dispersion having a size twice that of the case of using a single nonlinear optical medium at the same efficiency ratio (or a decrease in efficiency).

Figure 12:
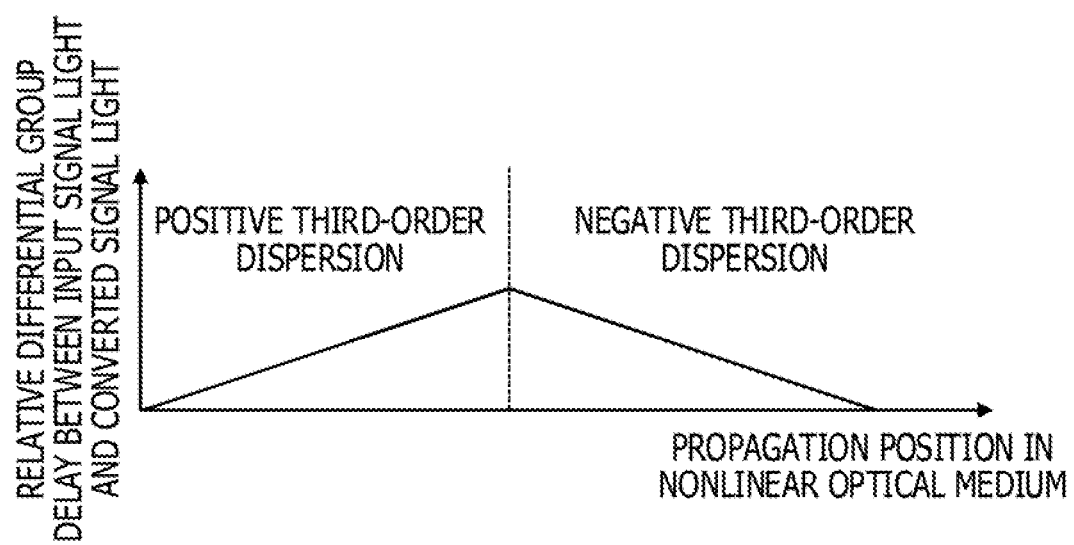
FIG. 12 is a schematic diagram for explaining the effect of the wavelength converter of FIG. 11.

FIG. 12 is a diagram for explaining the effect of the wavelength converter 30B of FIG. 11. The horizontal axis indicates the propagation position in the nonlinear optical medium, that is, the distance from the incidence plane of the first nonlinear optical medium 233, for example. It is assumed that the first nonlinear optical medium 233 and the second nonlinear optical medium 234 continue in the optical axis direction and the influence of the interface therebetween may be ignored.

The vertical axis indicates the relative differential group delay between input signal light and converted signal light. As propagation in the first nonlinear optical medium 233 proceeds, the relative differential group delay increases upon the influence of third-order dispersion, and phase deviation between the input signal light and the converted signal light increases. However, propagation in the second nonlinear optical medium 234 having a third-order dispersion value of the opposite sign reduces the relative differential group delay, so that the relative differential group delay becomes minimum at the output plane of the second nonlinear optical medium 234.

This makes it possible to suppress a decrease in conversion efficiency due to phase mismatch between light waves.

All of the wavelength converters 30, 30A, and 30B may be applied to the optical communication devices 10 and 20 in FIG. 2. Controlling the wavelength $v_P$ of excitation light makes it possible to convert input signal light to a desired wavelength band (the L band, the S band, or the like). In the optical communication devices 10 and 20, combining the nonlinear optical media having different signs or properties makes it possible to compensate for at least one of the phase mismatch due to dispersion properties and frequency-dependent polarization rotation due to birefringence properties, and thus to maintain the wavelength conversion efficiency over a wide band.

The wavelength conversion of the embodiment encompasses overall optical parametric amplifications including generation of sum frequency or difference frequency, generation of harmonic, optical parametric oscillation, and the like. Hence, for example, when a "wavelength converter" is mentioned in claims, it encompasses a sum frequency generator, a difference frequency generator, a harmonic generator, optical parametric oscillator, optical parametric amplifier, and the like.

In the case where the embodiment is applied to an optical parametric amplifier or the like as well, a first nonlinear optical medium and a second nonlinear optical medium having different optical properties (or different signs) from each other are combined. Excitation light having a first wavelength, excitation light having a second wavelength, and signal light having a third wavelength are made incident on a first nonlinear optical medium to generate idler light having a fourth wavelength.

The length (L1) of the first nonlinear optical medium and the length (L2) of the second nonlinear optical medium in the optical axis direction are designed such that at least one of the relative differential group delay (or the phase mismatch) of the converted signal light relative to the input signal light and the relative polarization angle between the input signal light and the excitation light is minimized at the exit plane of the second nonlinear optical medium.

The wavelength conversion or optical parametric amplification using a single wavelength of excitation light may be considered as the case where the first excitation light and the second excitation light have the same wavelength or frequency in a four-wave mixing. The excitation light source may be a light source outside the wavelength converter or optical parametric amplifier. Excitation light may be made incident on the first nonlinear optical medium through an optical waveguide such as an optical fiber, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical communication device comprising:
   an excitation light source that outputs excitation light;
   a multiplexer that multiplexes signal light and the excitation light outputted from the excitation light source;
   a first nonlinear optical medium into which the multiplexed excitation light and the signal light are inputted; and
   a second nonlinear optical medium that is coupled to the first nonlinear optical medium in series and has an optical property different from that of the first nonlinear optical medium, wherein
   the first nonlinear optical medium generates polarization rotation in a first direction, depending on a frequency of a light wave propagating in the first nonlinear optical medium, and
   the second nonlinear optical medium generates polarization rotation in a second direction opposite to the first direction, depending on the frequency.

2. The optical communication device according to claim 1, wherein
   in the first nonlinear optical medium, a fourth derivative relating to a frequency of a propagation constant has a first sign, and
   in the second nonlinear optical medium, the fourth derivative has a second sign different from the first sign.

3. The optical communication device according to claim 1, wherein
   in the first nonlinear optical medium, a third derivative relating to a frequency of a propagation constant has a first sign, and
   in the second nonlinear optical medium, the third derivative has a second sign different from the first sign.

4. The optical communication device according to claim 1, wherein
   a length of the first nonlinear optical medium in an optical axis direction and a length of the second nonlinear optical medium in the optical axis direction are designed such that at least one of relative differential group delay of the converted signal light relative to the input signal light and a relative polarization angle between excitation light inputted to the first nonlinear optical medium and the input signal light is minimized at an exit plane of the second nonlinear optical medium.

5. An optical communication method comprising:
   making input signal light having a first wavelength and excitation light having a second wavelength different from the first wavelength incident on a wavelength converter in which a first nonlinear optical medium and a second nonlinear optical medium having an optical property different from that of the first nonlinear optical medium are coupled in series, to generate converted signal light having a third wavelength different from the first wavelength and the second wavelength; and
   outputting, to an optical transmission path, the converted signal light outputted from the second nonlinear optical medium, wherein
   the first nonlinear optical medium generates polarization rotation in a first direction, depending on a frequency of a light wave propagating in the first nonlinear optical medium, and
   the second nonlinear optical medium generates polarization rotation in a second direction opposite to the first direction, depending on the frequency.

* * * * *